United States Patent
Kumari et al.

(10) Patent No.: US 10,475,125 B1
(45) Date of Patent: Nov. 12, 2019

(54) UTILIZING FINANCIAL DATA OF A USER TO IDENTIFY A LIFE EVENT AFFECTING THE USER

(71) Applicants: Neha Kumari, Sunnyvale, CA (US); Lulu Cheng, Albany, CA (US); Anilkumar Pillai, Sunnyvale, CA (US); Prateek Kakirwar, Newark, CA (US)

(72) Inventors: Neha Kumari, Sunnyvale, CA (US); Lulu Cheng, Albany, CA (US); Anilkumar Pillai, Sunnyvale, CA (US); Prateek Kakirwar, Newark, CA (US)

(73) Assignee: Intuit Inc., Mountain View, CA (US)

(*) Notice: Subject to any disclaimer, the term of this patent is extended or adjusted under 35 U.S.C. 154(b) by 757 days.

(21) Appl. No.: 15/143,484

(22) Filed: Apr. 29, 2016

(51) Int. Cl.
 *G06Q 40/06* (2012.01)
 *G06N 5/04* (2006.01)
 *G06N 20/00* (2019.01)

(52) U.S. Cl.
 CPC ............. *G06Q 40/06* (2013.01); *G06N 5/04* (2013.01); *G06N 20/00* (2019.01)

(58) Field of Classification Search
 CPC ........ G06N 99/005; G06N 20/00; G06N 5/04; G06Q 40/06
 See application file for complete search history.

(56) References Cited

U.S. PATENT DOCUMENTS

| 6,519,571 | B1 * | 2/2003 | Guheen | G06Q 30/02 |
| | | | | 705/14.66 |
| 2004/0193652 | A1 * | 9/2004 | Wendker | G06F 17/3056 |
| 2007/0067269 | A1 * | 3/2007 | Rudge | G06F 9/451 |
| 2008/0201634 | A1 * | 8/2008 | Gibb | G06F 17/30905 |
| | | | | 715/256 |
| 2010/0100469 | A1 * | 4/2010 | Buchanan | G06Q 10/06 |
| | | | | 705/35 |
| 2015/0088739 | A1 * | 3/2015 | Desai | G06Q 20/322 |
| | | | | 705/42 |
| 2016/0259491 | A1 * | 9/2016 | Jacobs | G06F 9/4443 |

(Continued)

FOREIGN PATENT DOCUMENTS

| WO | WO-2008103592 A1 * | 8/2008 | G06F 3/0484 |
| WO | WO-2013091230 A1 * | 6/2013 | G06F 3/04817 |
| WO | WO-2016141016 A1 * | 9/2016 | G06F 3/0481 |

OTHER PUBLICATIONS

Kumaran et al.: Classification Models for New Event Detection, 2002, ACM, pp. 1-7. (Year: 2002).*

(Continued)

*Primary Examiner* — Bijendra K Shrestha
(74) *Attorney, Agent, or Firm* — Ferguson Braswell Fraser Kubasta PC

(57) ABSTRACT

The invention relates to a method for identifying a life event affecting a user. The method includes obtaining a classification model. The classification model models how financial data of a user relates to life events. Also, the method includes gathering the financial data of the user. The financial data of the user matches at least a subset of the classification model. In addition, the method includes identifying a life event affecting the user by applying the classification model to the financial data of the user. Still yet, the method includes customizing a user interface of an application that is utilized by the user. The customization is based on the identified life event.

20 Claims, 11 Drawing Sheets

(56) References Cited

U.S. PATENT DOCUMENTS

2016/0371792 A1\* 12/2016 Luo .................... G06Q 30/0201
2017/0193558 A1\* 7/2017 Lyons ................ G06Q 30/0269
2017/0262164 A1\* 9/2017 Jain ...................... G06F 3/0482

OTHER PUBLICATIONS

Royer, Traci: Usinfg Scenario-Based Designs to Review User Interface Changes and Enhancements, 1995, ACM, pp. 237-246. (Year: 1995).\*

Kumaran et al.: Classification Model for New Event Detection, 2002, ACM, pp. 1-7. (Year: 2002).\*

\* cited by examiner

TurboTax

| Personal Info | Federal Taxes | State Taxes |

Income | Deductions | Taxes & Credits | Miscellaneous

For the 2015 tax year, do any of the following apply to you?

Yes | No

- Mortgage Interest
- Mortgage Prepayment Penalties
- Property Taxes
- Occupational Taxes
- Charitable Donations
- Business Expenses
- Medical Expenses
- Casualty and Theft Losses
- Investment Expenses

SUBMIT

FIG. 4A

UTILIZING FINANCIAL DATA OF A USER TO IDENTIFY A LIFE EVENT AFFECTING THE USER

BACKGROUND

User profiles can be used to help derive meaningful insights, and to target a particular customer segment. Various events affecting a user's life may be useful for developing a profile of the user. For example, a life event such as a user's profession is one very important part of his or her user profile, and may be relevant and important information when analyzing a user base. Even more, a business may be able to better serve its customers by knowing the professions of the users that include its customer base. In addition, once a life event is identified as affecting a user, other information about the user may be deduced. For example, once a user's profession is known, additional significant information about the user may be deduced, such as whether or not the user is self-employed, which may be useful for interacting the user. Short of asking directly what a person's profession is, that information is usually not readily attained.

SUMMARY

In general, in one aspect, the invention relates to a method for identifying a life event affecting a user. The method includes obtaining a classification model, where the classification model models how financial data of a user relates to life events. Also, the method includes gathering the financial data of the user. The financial data of the user matches at least a subset of the classification model. In addition, the method includes identifying a life event affecting the user by applying the classification model to the financial data of the user. Still yet, the method includes customizing a user interface of an application that is utilized by the user. The customization is based on the identified life event.

In general, in one aspect, the invention relates to a system for identifying a life event affecting a user. The system includes a hardware processor and memory. The software instructions are stored in the memory and configured to execute on the hardware processor. The software instructions, when executed by the hardware processor, cause the hardware processor to obtain a classification model. The classification model models how financial data of a user relates to life events. Also, the software instructions, when executed by the hardware processor, cause the hardware processor to gather the financial data of the user. The financial data of the user matches at least a subset of the classification model. In addition, the software instructions, when executed by the hardware processor, cause the hardware processor to identify a life event affecting the user by applying the classification model to the financial data of the user. Still yet, the software instructions, when executed by the hardware processor, cause the hardware processor to customize a user interface of an application utilized by the user. The customization is based on the identified life event.

In general, in one aspect, the invention relates to a non-transitory computer readable medium for identifying a life event affecting a user. The non-transitory computer readable medium stores instructions which, when executed by a computer processor, include functionality for obtaining a classification model. The classification model models how financial data of a user relates to life events. Also, the non-transitory computer readable medium stores instructions which, when executed by the computer processor, include functionality for gathering the financial data of the user. The financial data of the user matches at least a subset of the classification model. Additionally, the non-transitory computer readable medium stores instructions which, when executed by the computer processor, include functionality for identifying a life event affecting the user by applying the classification model to the financial data of the user. Moreover, the non-transitory computer readable medium stores instructions which, when executed by the computer processor, include functionality for customizing a user interface of an application utilized by the user. The customization is based on the identified life event.

Other aspects of the invention will be apparent from the following description and the appended claims.

BRIEF DESCRIPTION OF DRAWINGS

FIGS. 4A, 4B, and 4C illustrate the customization of a user interface of an application based on an identified life event of a user, in accordance with one or more embodiments of the invention.

DETAILED DESCRIPTION

Figure 1A:
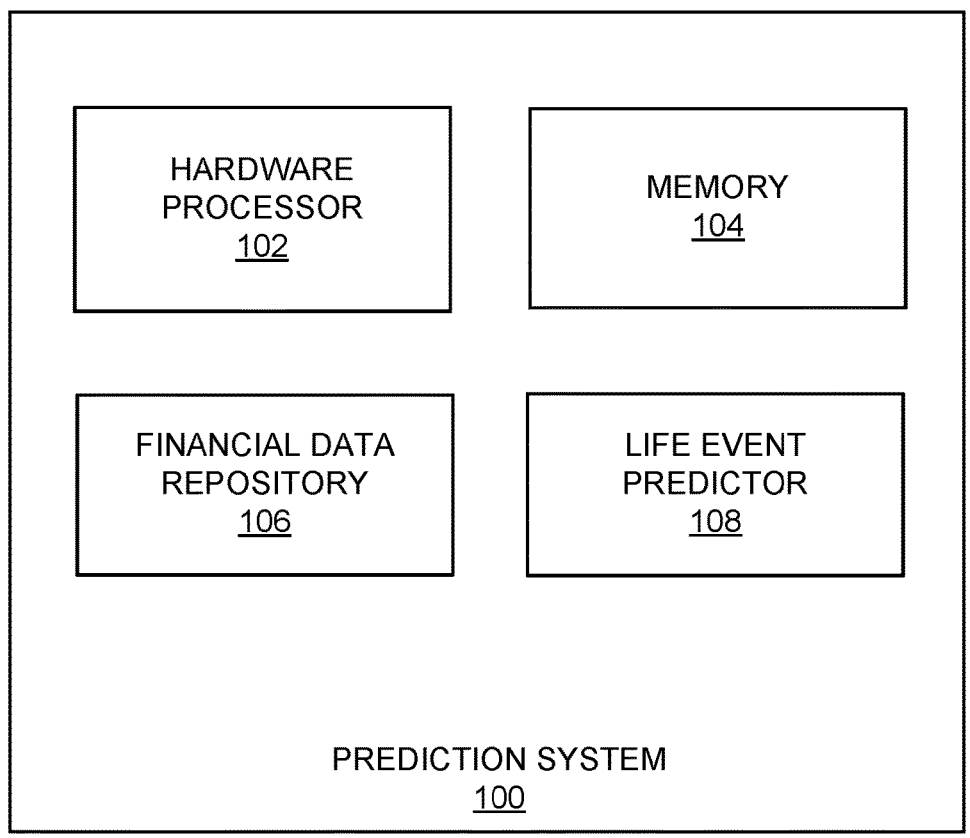
FIGS. 1A and 1B show schematic diagrams of a system for identifying a life event affecting a user, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A platform with a large user base can perform meaningful analyses of the data associated with its users. One example of such analysis includes profiling the users of a user base to learn about the customer segments including the user base. Such profiling may include utilizing user data to identify one or more life events affecting a user. For example, user data may be utilized to identify a profession of a given user. Determining the profession of a user may be useful for determining whether the user works as a salaried or non-salaried employee, or belongs to an on-demand profession. Even more, by determining the profession of a given user, further analysis may be used to determine the likelihood of the user being self-employed. For example, the likelihood of a doctor being self-employed may be lower than the likelihood of a driver being self-employed.

After determining the profession of a user, this information may be utilized in a variety of different manners. As one example, products or advertising may be selected for, and/or recommended to, a user based on the user's profession. Even more, subsequent interactions of the user with a customizable piece of software may be tailored based on the user's profession. For example, accounting or tax software may be tailored to request only relevant data based on a user's previously determined profession. In this manner, the determination of the user's profession may improve user experience and reduce, or eliminate, the time spent by the user engaging in unproductive interactions with the software.

FIG. 1A shows a prediction system (100) in accordance with one or more embodiments of the invention. The prediction system (100) is shown to include a hardware processor (102), memory (104), a financial data repository (106), and a life event predictor (108), each of which is discussed in more detail below.

The life event predictor (108) includes hardware and/or software for predicting a life event affecting a given user. As described in more detail below, a life event affecting a user may be identified using financial data of the user. As used herein, a "user" includes any person that utilizes or operates a particular software application. For example, in one or more embodiments, the user may be a person that utilizes a financial management application for managing or tracking finances. Also, a "life event" denotes any action, inaction, occurrence, non-occurrence, purchase, or change of any kind, that impacts a user's financial position and/or data. The life event affecting the user may include one or more of a debt event, an income event, and an asset event. Examples of debt events include the loss of a job, a change of residence, having a child, a change in marital status, etc. Examples of income events including, a profession, a promotion, a change of profession, a change in marital status, a change of residence, etc. An example of an asset event includes a purchase or receipt of a product or service, such as, for example, a home. Of course, such examples are non-limiting, and a life event may include any other occurrence that may have an effect on a contributing consumer's financial data. Moreover, the "profession" of a user includes any paid occupation of the user.

In one or more embodiments, financial data of a user may be stored in the financial data repository (106). In one or more embodiments, the financial data repository (106) is any type of storage unit and/or device (e.g., a file system, database, collection of tables, or any other storage mechanism) for storing data. Further, the financial data repository (106) may include multiple different storage units and/or devices. The multiple different storage units and/or devices may or may not be of the same type or located at the same physical site. As an option, the financial data repository (106) may include a vertical data warehouse.

In one or more embodiments, the financial data of the user may include income information of the user, spending information of the user, payment information of the user, and/or transaction information of the user. As an option, the financial data of the user may be obtained by querying the financial data repository (106). For example, a query directed to the financial data of a given user may request all income for the user during the course of a particular year, as well as all of the user's credit card and debit card transactions for that year, and the user's payments to his or her credit card accounts.

In one or more embodiments, the financial data of the user may other information of the user. For example, the financial data of the user may include a ZIP code of the user (e.g., a ZIP code where the user lives or owns a home, etc.), an age of the user, a gender of the user, an education level of the user, a residential status of the user (e.g., rent, own, etc.). In one or more embodiments, a number of credit card accounts or bank accounts associated with the user may be included in or derived from the financial data. For example, the financial data may include a number of credit card accounts opened in the name of the user, a number of savings accounts opened in the name of the user, and/or a number of checking accounts opened in the name of the user.

In one or more embodiments, the financial data repository (106) may store historical data. As an option, the historical data stored in the financial data repository (106) includes the financial data of numerous other users. Accordingly, the financial data repository (106) may store data including income information, spending information, payment information, and/or transaction information for a plurality of users. For example, the financial data repository (106) may store the income, average number of monthly credit card transactions, pay period frequency, average value of monthly credit card transactions, average monthly credit card payment, total value of monthly credit card payments, average number of debit card transactions, a maximum transaction value, a residential status, and/or education level, etc., for each of a plurality of users.

In one or more embodiments, the financial data of the user and/or the historical data may originate from a plurality of different sources. As an option, the sources of financial data and/or historical data may include one or more software applications, such as financial management applications. A software application may include an application executing locally on a user's machine, or a platform hosted by a third-party, such as an application in the "cloud". For example, the sources of financial data and/or historical data may include financial management applications such as Intuit QuickBooks, Intuit QuickBooks Office, Intuit QuickBooks Self-Employed, Intuit Quicken Desktop, Intuit TurboTax, Intuit's mint.com, and/or FinanceWorks powered by Quicken, etc. Accordingly, the financial data repository (106) may contain real-time transaction data regarding income events, payment events, and spending events, as the events occur. As described in more detail below, the data of one or more events may be manipulated in a manner to generate features, which may be used as attributes in machine learning processes. For example, for a given user, all credit card purchases made by the user may be summed to determine the user's monthly credit card spending.

In one or more embodiments, the hardware processor (102) includes functionality to execute logic of the life event predictor (108). Moreover, logic of the life event predictor may reside in the memory (104) during the execution. In one or more embodiments, the prediction system (100) may include hardware components (not shown) for enabling communication between the hardware processor (102), the memory (104), the financial data repository (106), and/or the life event predictor (108). For example, the prediction system (100) may include a system bus for communication between the hardware processor (102), the memory (104), the financial data repository (106), and/or the life event predictor (108).

Figure 1B:
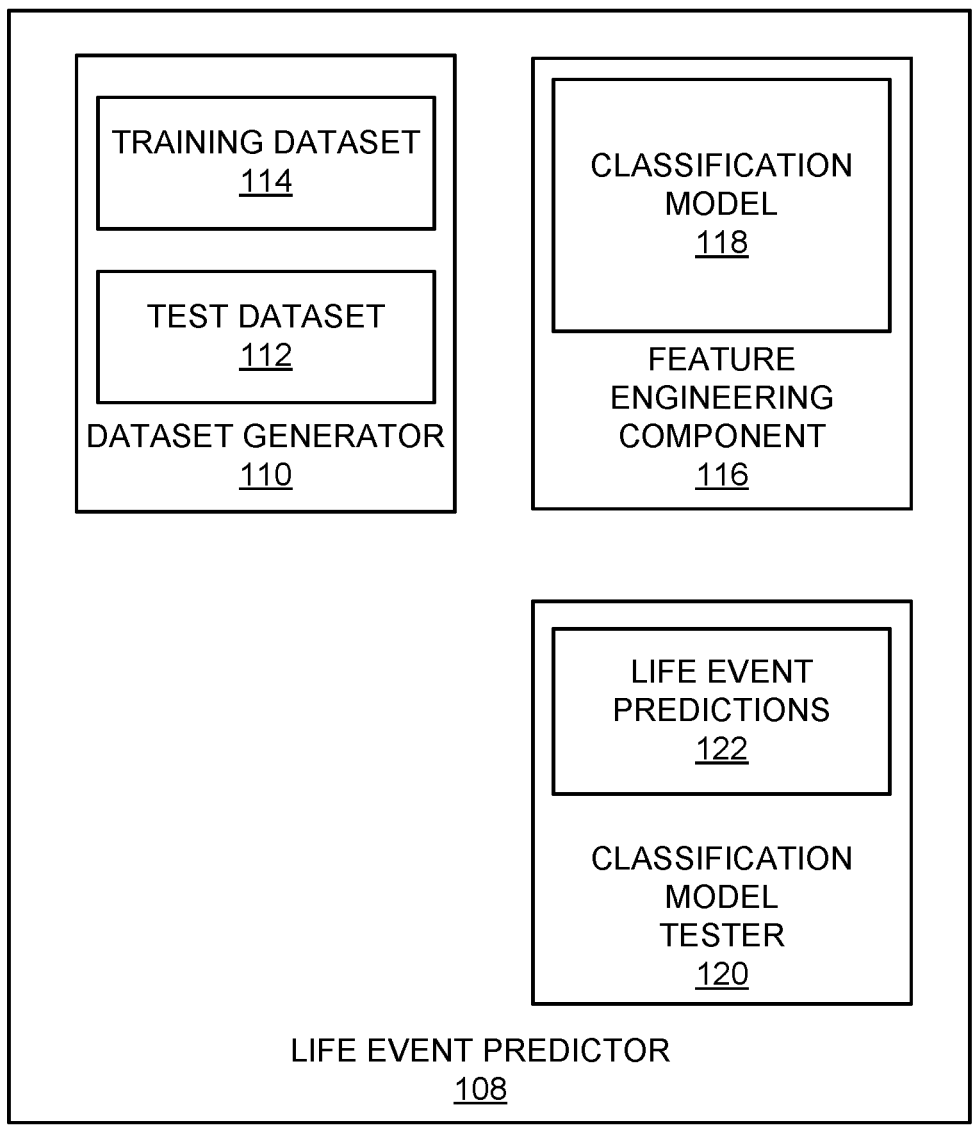

Referring now to FIG. 1B, the life event predictor (108) includes a dataset generator (110), a feature engineering component (116), and a classification model tester (120). Further, the dataset generator (110) is shown to generate a training dataset (114) and a test dataset (112). Also, the feature engineering component (116) is shown to generate a classification model (118). The classification model tester (120) is shown to generate one or more life event predictions (122). Each component of the life event predictor (108) is discussed in more detail, below.

In one or more embodiments, the dataset generator (110) may generate the training dataset (114) using historical data obtained from the financial data repository (106). Similarly, the dataset generator (110) may generate the test dataset (112) using historical data obtained from the financial data repository (106). For example, the dataset generator (110) may retrieve historical data, from the financial data repository (106) for a plurality of users. As noted above, the historical data may include, for each of the users, various aspects of financial data. Moreover, the training dataset (114) may be configured to contain the historical data of a first portion of the plurality of users, and the test dataset (112) may be configured to contain the historical data of a second portion of the plurality of users. As an option, the number of users partitioned into the training data set (114) relative to the number of users partitioned into the test data set (112) may be based on a ratio. For example, the ratio of users in the training data set (114) relative to the users in the test data set (112), or of users in the test data set (112) relative to the users in the training data set (114), may be 1:1, 1:2, 1:3, 2:3, etc.

In one or more embodiments, the dataset generator (110) may cleanse the historical data prior to generating the training dataset (114) and/or the test dataset (112). Cleansing the historical data includes any operation that removes an aspect (e.g., one or more values, one or more rows, one or more columns, etc.) of the historical data such that the aspect of data is prevented from being included in the training dataset (114) and/or the test dataset (112). For example, an aspect of the historical data that is determined to be incomplete (i.e., missing values) or incorrect may be removed such that it is not included in the training dataset (114) and/or the test dataset (112).

In one or more embodiments, the dataset generator (110) may prune the historical data prior to generating the training dataset (114) and/or the test dataset (112). Pruning the historical data may include any operation that reduces a number of features available for inclusion in a classification model (118), as discussed in more detail below. For example, in embodiments wherein the classification model (118) includes a decision tree-based classifier, pruning the historical data may ultimately reduce a number of features available for use as nodes or decisions within decision trees.

In one or more embodiments, the dataset generator (110) may perform other operations on the historical data that optimize the historical data for queries run against the historical data.

In one or more embodiments, the feature engineering component (116) may generate the classification model (118) using the historical data of the users in the training dataset (114). Accordingly, the feature engineering component (116) may generate the classification model (118) using any combination of income information, spending information, payment information, and/or transaction information for each of the users in the training dataset (114). As one example, using the income, average number of monthly credit card transactions, pay period frequency, average value of monthly credit card transactions, average monthly credit card payment, total value of monthly credit card payments, average number of debit card transactions, maximum transaction value, residential status, and education level for each of a plurality of users in the training dataset (114), the feature engineering component (116) may generate the classification model (118).

In one or more embodiments, the feature engineering component (116) may identify particular attributes within the historical data of the users in the training dataset (114) prior to generating the classification model (118) by. More specifically, the feature engineering component (116) may identify and select attributes within the historical data that are, for a given life event, more deterministic than other attributes within the historical data. As an option, one or more of the attributes identified by the feature engineering component (116) may be generated by combining the data from two or more sources (e.g., by combining the data collected from multiple credit card accounts, bank accounts, etc.).

In one or more embodiments, for each of the one or more users in the training dataset (114), the feature engineering component (116) may extract one or more of the following features to be utilized as attributes for generating the classification model (118): a profession of the user, an identifier of the user, a ZIP code of the user, an age of the user, a gender of the user, an education level of the user, a residential status of the user, an annual income of the user, an average daily transaction frequency of the user, an average number of monthly credit transactions of the user, an average monthly paycheck frequency of the user, a minimum transaction value of the user, a maximum transaction value of the user, an average of monthly credit card payments by the user, an average monthly credit card sum of the user, an average monthly debit sum of the user, a number of credit card accounts of the user, a number of bank accounts held by the user, and/or a number of checking accounts held by the user.

In one or more embodiments, the classification model (118) includes a decision tree-based classifier. For example, the classification model (118) may include one or more trees of decisions and outcomes. Moreover, the classification model (118) may include numerous different decision trees, wherein each tree includes a plurality of decision nodes used to determine whether a particular life event is affecting a user. As one example, the classification model (118) may include various different decision trees, wherein each tree includes a plurality of decision nodes used to determine whether a given user works as a particular profession (e.g., a pilot, an engineer, a teacher, etc.) Accordingly, based on the traversal of a series of decision nodes of a tree, wherein each decision node results in a decision based on the comparison of a value from the financial data of the user with a threshold value associated with a feature in the decision tree, a determination is made as to whether the user works as the particular profession. Moreover the determinations of different decision trees may be aggregated to arrive at a more informed determination regarding whether the user works as the particular profession.

As another example, the classification model (118) may include one or more decision trees, where each tree includes a plurality of decision nodes used to determine which of a plurality of life events is affecting a given user (e.g., did the user get promoted, purchase a home, or have a child?). As another specific example, the classification model (118) may include one or more decision trees, where each tree includes a plurality of decision nodes used to determine whether the user is one of a plurality of professions (e.g., is the user one of a doctor, an engineer, a pilot, a teacher, a real estate agent, or a nurse?). The determinations of different decision trees may be aggregated to arrive at a more informed determination regarding whether the user works as one of the specifically enumerated professions.

As yet another example, where the life event is self-employment, the classification model (118) may be used to determine whether or not a particular user is self-employed.

In one or more embodiments, and, as described in more detail below, based on a determination or prediction regarding a life event affecting a user, a software platform may be recommended to the user, and/or an interface of a software platform may be customized for the user.

In one or more embodiments, the classification model tester (120) may test the classification model (118) using the test dataset (112). Testing the classification model (118) using the test dataset (112) may include applying the classification model (118) to the financial data of one or more users included in the test dataset (112). As a result of applying the classification model (118) to the financial data of a user in the test dataset (112), a life event affecting the user may be identified. For example, a life event such as a particular profession, a newborn child, or recent marriage may be identified as currently affecting the user. Accordingly, a life event affecting the user may be predicted based on the financial data of the user. One or more predicted life events may be maintained as life event predictions (122). For each of the users in the test dataset (112), any life events affecting the user may already be known. For example, the users of the test dataset (112) may have previously identified any relevant life events, and/or the life events affecting the user may be included in the historical data. Accordingly, the life event predictions (122) may be compared with the known life events, and the comparisons may be used as feedback into the feature engineering component (116) for improving the classification model (118).

While FIGS. 1A-1B show one possible configuration of components, other configurations may be used without departing from the scope of the invention. For example, various components may be combined to create a single component. As another example, the functionality performed by a single component may be performed by two or more components.

Figure 2A:
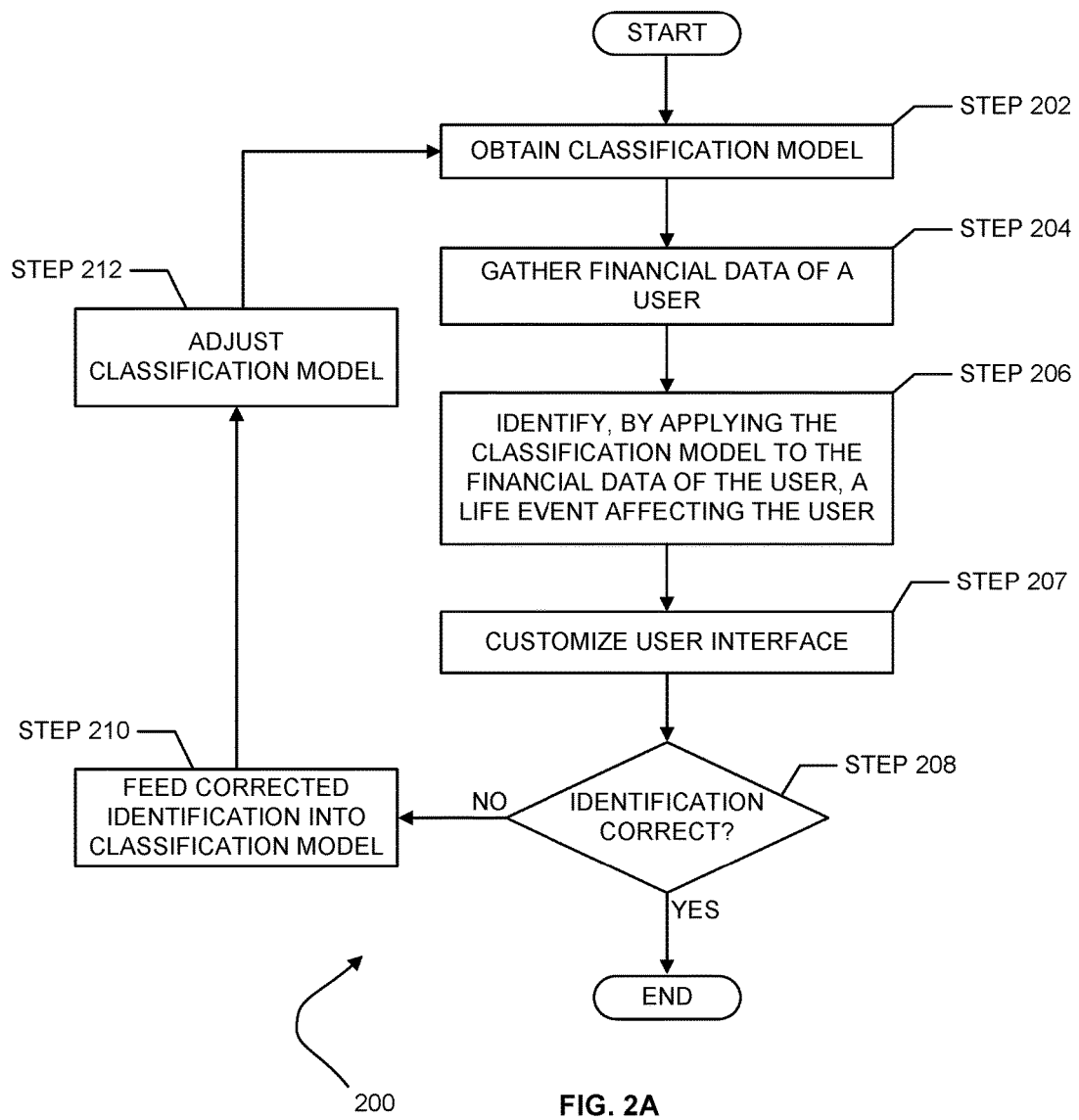
FIGS. 2A and 2B show flowcharts of methods for identifying a life event affecting a user, in accordance with one or more embodiments of the invention.

FIG. 2A depicts a flowchart of a method (200) for identifying a life event affecting a user, in accordance with one or more embodiments of the invention. In one or more embodiments, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method (200) described in reference to FIG. 2A may be practiced using the prediction system (100) described in reference to FIGS. 1A-1B, above, and/or involving the computing system (500) described in reference to FIG. 5A.

As shown in FIG. 2A, a classification model is obtained at Step 202. The classification model models how financial data of a user relates to life events affecting that user. In one or more embodiments, the classification model is obtained from a feature engineering component. In one or more embodiments, the feature engineering component may have previously generated the classification model using a training dataset. Moreover, the accuracy of the classification model may have previously been verified using a test dataset. Both the test dataset and the training dataset may be obtained from a dataset generator. The test dataset and the training dataset may both contain historical data for a plurality of users. The historical data may contain any combination of financial data and/or other data related to the users.

Further, financial data of a particular user is gathered at Step 204. Also, a life event affecting the user is identified, by applying the classification model to the financial data of the user, at Step 206. The financial data of the user may be gathered from a financial data repository, an application used by the user, a platform used by the user, an account of the user, etc. The financial data of the user may match at least a subset of the classification model. In other words, the attributes of the classification model used to identify the life event affecting the user match with features of the user's financial data. In one or more embodiments, the financial data may include income information of the user, spending information of the user, payment information of the user, and/or transaction information of the user. In one or more embodiments, spending patterns of the user, a ZIP code of the user, an age of the user, a gender of the user, an education level of the user, and/or a residential status of the user may be included in, or derived from, the financial data of the user. Also, a number of credit card accounts or bank accounts associated with the user may be included in or derived from the financial data.

The user may be targeted by the method (200) for any of a variety of reasons. For example, the life event affecting the user may be identified in response to the user interacting with (e.g., logging into, registering an account with, purchasing a service with, etc.) a software application. Also, the life event may include any of a debt event, an income event, and/or an asset event of the user. For example, the life event affecting the user may include the birth of a new child to the user, the purchase of a home or vehicle by the user, a promotion of the user, or the user's profession.

Moreover, a user interface is customized at Step 207. The user interface may be customized based on the life event identified to be affecting the user. In one or more embodiments, the user interface is of a software application used by the user. For example, the user interface of a financial management application used by the user may be customized based on the life event affecting the user. In one or more embodiments, the customization of the user interface includes any modification that alters the display or appearance of the user interface. As general examples, additional elements may be displayed on the user interface, or a portion of the user interface may be prevented from being displayed to the user based on the customization. More specifically, the user interface may be customized by adding user interface elements that increase the relevance of the software application to the user, or remove a portion of the user interface that is not relevant to the user. As a result, the user's interaction with the software application may be improved by reducing the user's time spent, or frustration due to, interacting with the software application.

In one or more embodiments, the user may be classified based on the identified life event. As an option, the user may be classified into a user segment or consumer segment. For example, if the identified life event is that the user recently gave birth to a child, then the user may be classified within a parent consumer segment. As another example, if the identified life event is the profession of the user, then the user may be classified into a user segment containing similar professions. For example, if the life event affecting the user is the user's profession as a doctor, then the user may be classified into a user segment of medical professionals. In one or more embodiments, products and/or services may thereafter be offered to the user based on the user segment into which the user has been classified. For example, if the user is identified as a doctor and classified into a user segment of medical professionals, then the user may be subsequently offered for purchase a financial management application, such as accounting or tax preparation software, that has been tailored for medical professionals.

Also, a determination is made, at Step 208, as to whether the identification of the life event (at Step 206) is correct. In one or more embodiments, the user may be asked whether the identified life event is currently affecting him or her. For example, if, at Step 206, the life event affecting the user is identified to include the purchase of a new house, then, at Step 208, the user may be asked whether he or she recently purchased a new house. As another example, if, at Step 206, the life event affecting the user is identified to include the birth of a new child, then, at Step 208, the user may be asked whether he or she recently had a new child. Still yet, if, at Step 206, the life event affecting the user is the user's profession, then, at Step 208, the user may be asked whether he or she actually works as the identified profession.

In one or more embodiments, data may be subsequently collected to determine whether the identification at Step 206 is correct, without directly asking the user if the identification at Step 206 is correct. In other words, subsequent application of the classification model to new or otherwise additional financial data of the user may be used to determine, at Step 208, whether the identification of the life event is correct. For example, income information of the user, spending information of the user, payment information of the user, and/or transaction information of the user that is collected after the identification of the life event, at Step 206, may be utilized to determine, at Step 208, whether the identification is correct.

In one or more embodiments, if it is determined, at Step 208, that the identification of the life event is correct, then the method (200) ends with respect to the user. However, if it is determined, at Step 208, that the identification of the life event is not correct, then, at Step 210, the corrected identification is fed to the classification model. For example, if, at Step 206, the user is identified to work as an engineer, but, at Step 208, the user indicates that he or she actually works as a pilot, then the user's profession as a pilot is fed back into the classification model at Step 210. In one or more embodiments, feeding the corrected identification into the classification model may include adding the user, and his or her financial data, as a data point (i.e., a row, etc.) within a training dataset.

Moreover, at Step 212, the classification model is adjusted using the feedback from Step 210. In one or more embodiments, the adjustment of the classification model may include generating a new classification model using an updated training dataset. For example, after the user, and his or her financial data, is added to a training dataset, a new classification model may be generated using the training dataset that includes the user and his or her financial data. In this manner, the method (200) may be iteratively improved, such that accuracy may be increased for subsequent applications of the classification model to user financial data.

Figure 2B:
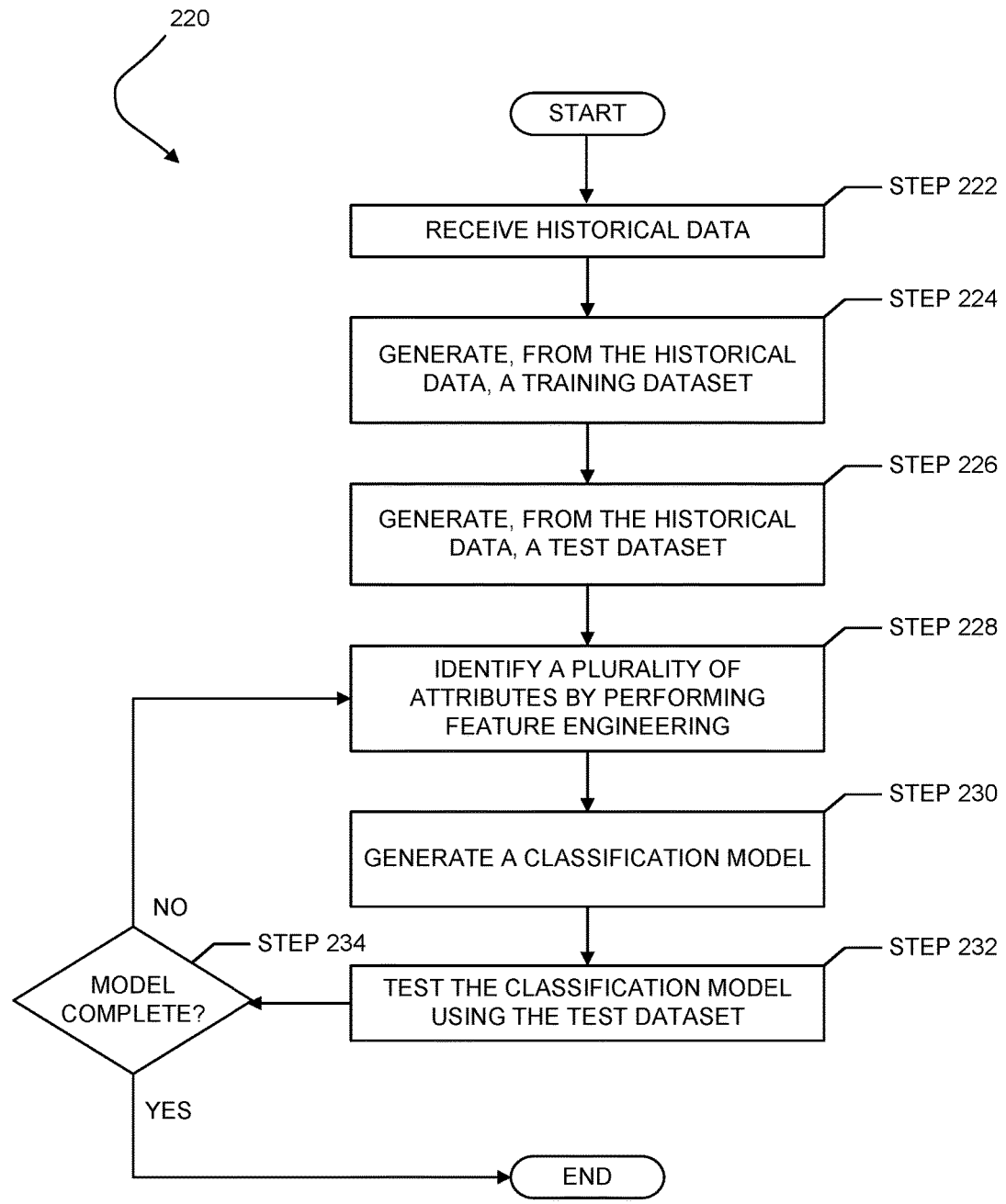

FIG. 2B depicts a flowchart of a method (220) for generating a classification model, in accordance with one or more embodiments of the invention. In one or more embodiments, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method (220) described in reference to FIG. 2B may be practiced using the prediction system (100) described in reference to FIGS. 1A and 1B, above, and/or involving the computing system (500) described in reference to FIG. 5A.

Initially, at Step 222, historical data is received. In one or more embodiments, the historical data may include the financial data of a plurality of users. For example, the historical data may include, for each of a plurality of users, income information of the user, spending information of the user, payment information of the user, account information of the user, transaction information of the user, a ZIP code of the user, an age of the user, a gender of the user, an education level of the user, and/or a residential status of the user.

In one or more embodiments, the historical data may be retrieved from a financial data repository. For example, the historical data may be received from the financial data repository in response to a query. The historical data may be received over any applicable data channel, such as a system bus or network interface.

Next, a training dataset is generated, at Step 224, from the historical data. In one or more embodiments, the training dataset contains the historical data of a first portion of the plurality of users. Also, a test dataset is generated, at Step 226, from the historical data. In one or more embodiments, the test dataset contains the historical data of a second portion of the plurality of users. In one or more embodiments, the historical data may be partitioned into the first portion and the second portion based on a predetermined ratio. In one or more embodiments, the historical data may be partitioned such that the historical data for any user included in the test dataset is not included in the training dataset, and the historical data for any user included in the training dataset is not included in the test dataset.

Feature engineering is performed, at Step 228, on the training dataset. Based on the feature engineering performed on the training dataset, a classification model is generated at Step 230. The feature engineering performed on the training dataset includes any manipulation of the training dataset that identifies deterministic attributes within the training dataset. In one or more embodiments, the feature engineering may include performing mathematical operations on individual values within the training dataset. In one or more embodiments, the attributes include, for each of the users within the training dataset, attributes of spending behaviors of the user in the training dataset. For example, if the historical dataset includes credit card purchases, credit card payments, and checking account information for each of a plurality of users, then the feature engineering may include a manipulation of such information. In particular, the feature engineering may include, for each of the users in the historical data, summing the values associated with the user's credit card purchases to determine a monthly credit card purchase amount, counting the number of purchase transactions occurring over a span of time to determine an average daily transaction frequency, and counting a number of checking accounts owned by the user.

In one or more embodiments, performing feature engineering may include calculating, for one or more features, a value that indicates feature importance based on an impurity index, such as the Gini impurity index or entropy. In one or more embodiments, performing feature engineering may include calculating, for one or features, a value that indicates to what effect inclusion of the associated feature will reduce classification error of a classification model including the feature. As used herein, a feature includes any variable or value, from the historical data, that may be used as an attribute of the classification model. In one or more embodiments, performing feature engineering may include creating accuracy error matrices and/or accuracy error plots of the features based on calculated feature importance. In one or more embodiments, performing feature engineering may include creating accuracy error matrices and/or accuracy error plots of the features based on a calculated reduction in classification error due to feature inclusion. Such accuracy error matrices and/or accuracy error plots may be utilized for selecting the attributes used in the classification model.

The classification model may be configured to use a selection of deterministic features as attributes of the classification model. In one or more embodiments, only features associated with a calculated feature importance that is above a pre-determined threshold may be selected for use as an attribute in the classification model, and/or only features associated with a calculated reduction in classification error due to feature inclusion that is above a pre-determined threshold may be selected for use as an attribute in the classification model. Accordingly, the classification model may be generated based on a subset of features identified within the historical data. For example, if the classification model will be used for predicting the profession of a user, and if income, gender, education level, age, average monthly debit card spending, average monthly credit card spending, and average daily purchase transaction frequency are determined to be the most highly deterministic attributes for predicting a user's profession (i.e., based on a comparison to a threshold), then such attributes may be included in the classification model.

In one or more embodiments, the classification model may be generated by applying a machine learning algorithm to the identified attributes of the historical data. As an option, the machine learning algorithm may include a random forest algorithm. Accordingly, a set of random decision trees may be generated by applying a machine learning algorithm to the attributes identified at Step 228. The decision trees may be subsequently used to identify a life event affecting a user.

At Step 232, the classification model is tested using the test dataset. The classification model may be tested by applying the classification model to the historical data of the users in the test dataset. For each of the users in the test data, testing the classification model may include identifying a life event affecting the user. For example, if the classification model is used to identify whether a user has been recently promoted, then testing the classification model may include, for each user in the test dataset, predicting whether or not the user has been recently promoted. Moreover, for validation purposes, each of the users in the test dataset may have recently been asked whether he or she was promoted. As another example, if the classification model is a single class classifier used to identify whether a user works as an engineer, then testing the classification model may include, for each user in the test dataset, predicting whether or not the user works as an engineer. As yet another example, if the classification model is a multi-class classifier used to identify whether the user works as one of an engineer, pilot, doctor, teacher, or real estate agent, then testing the classification model may include, for each user in the test dataset, predicting that the user works as one of an engineer, pilot, doctor, teacher, or real estate agent. For validation purposes, each of the users in the test dataset may have recently been asked to identify their profession. Accordingly, the results of the application of the classification model may be compared with user input to verify the accuracy of the classification model.

Based on the testing of the classification model at Step 232, it may be determined, at Step 234, whether the classification model is complete. In one or more embodiments, the classification model may be determined complete if the classification model predicts life events affecting the users of the test dataset with a level of accuracy above a pre-determined threshold. For example, if the classification model predicts life events affecting the users of the test dataset with greater than 70%, 75%, 80%, etc. accuracy, then the classification model may be determined to be complete. In one or more embodiments, the classification model may be determined complete immediately after the classification model is tested at Step 232, without any comparison to an accuracy threshold.

If it is determined, at Step 234, that the classification model is complete, then the method (220) ends. Moreover, the classification model may thereafter be used in a production environment for identifying life events affecting users, such as within the context of the method (200) of FIG. 2A. However, if it is determined, at Step 234, that the classification model is not complete, then the method (220) may return to Step 228, where feature engineering is again performed to identify another plurality of attributes, and the identified attributes are used to generate another classification model.

In one or more embodiments, the attributes identified, and the classification models generated, during the second and subsequent iterations of Steps 228-230 may differ from the attributes identified, and the classification models generated, during the first iteration of Steps 228-230. As an option, during the second and subsequent iterations of Step 228, the pre-determined threshold used for selecting features based on feature importance, may be increased or reduced to be more inclusive or less inclusive with respect to attribute selection. Similarly, as an option, during the second and subsequent iterations of Step 228, the pre-determined threshold used for selecting features based on reduction in classification error due to feature inclusion, may be increased or reduced to be more inclusive or less inclusive with respect to attribute selection. In other words, during the second and subsequent iterations of Step 228, features previously identified as being below a deterministic threshold may be selected for use as attributes used for generating a second, or subsequent, classification model; or, features previously identified as being above a deterministic threshold may be excluded from use as attributes for generating a second, or subsequent, classification model. In this manner, the method (220) for generating a classification model may iteratively generate classification models having an increased measure of accuracy with respect to predicting life events affecting users.

In one or more embodiments, the classification model may be generated, tested, and/or applied using a large-scale cluster-computing data processing platform, such as Apache Spark, Hadoop MapReduce, or Amazon Machine Learning. Moreover, the classification model may be built, tested, and/or applied using a statistical computing environment, such as the R software environment, that is integrated with the data processing platform.

While the various steps in the flowcharts described above are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

The following examples are for explanatory purposes only and not intended to limit the scope of the invention.

Figure 3A:
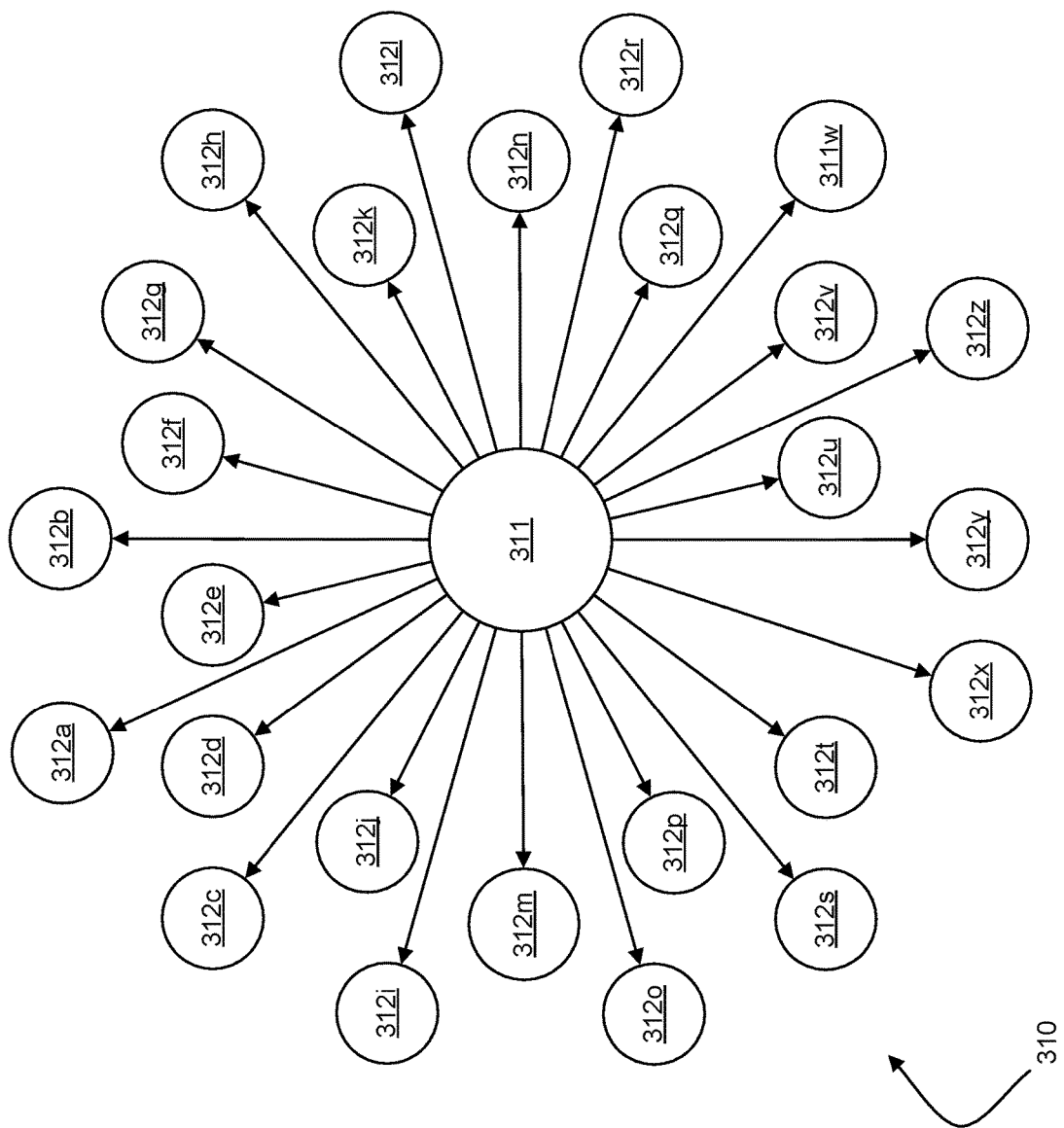
FIG. 3A shows a merchant vector spending pattern of a user, in accordance with one or more embodiments of the invention.

FIG. 3A shows an example of a merchant vector spending pattern (310), in accordance with one or more embodiments of the invention. This merchant vector spending pattern (310) may be practiced using the prediction system (100) of FIGS. 1A and 1B or the computing system (500) of FIG. 5A, and in conjunction with the method described with respect to FIGS. 2A and 2B, above.

As illustrated in FIG. 3A, the merchant vector spending pattern (310) of a user (311) is assembled using transaction information. In one or more embodiments, the merchant vector spending pattern (310) of the user (311) may be assembled by analyzing the spending information of the user (311). For example, by retrieving and analyzing credit card transactions, debit card transactions, etc. of the user (311), all merchants (312) from which the user (311) purchases goods and services may be extracted.

Each of the merchants (312a-312z) may represent a different physical or legal entity. For example, a first merchant (312a) may include a supermarket chain (e.g., one of all ShopRite stores, all Whole Foods stores, all Trader Joe's stores, or all Publix stores, etc.), a second merchant (312b) may include a coffee shop chain (e.g., one of all Peet's coffee shops, or all Starbucks coffee shops, etc.), and a third merchant (312c) may include a gas station chain (e.g., one of all Shell stations, or all Texaco stations, etc.). As another example, the first merchant (312a) may include a first supermarket location (e.g., a Publix at 123 Main Street), the second merchant (312b) may include a second supermarket location (e.g., a Publix as 456 Oak Street), and the third merchant (312c) may include a third supermarket location (e.g., a Publix at 789 Center Street).

In one or more embodiments, the merchant vector spending pattern (310) for the user (311) may be derived using the financial data of the user (311). Further, using the merchant vector spending pattern (310) of the user (311), the prediction of a life event may be validated or augmented. In other words, the merchant vector spending pattern (310) for the user (311) may be used to confirm a life event identified to be affecting the user (311).

Figure 3B:
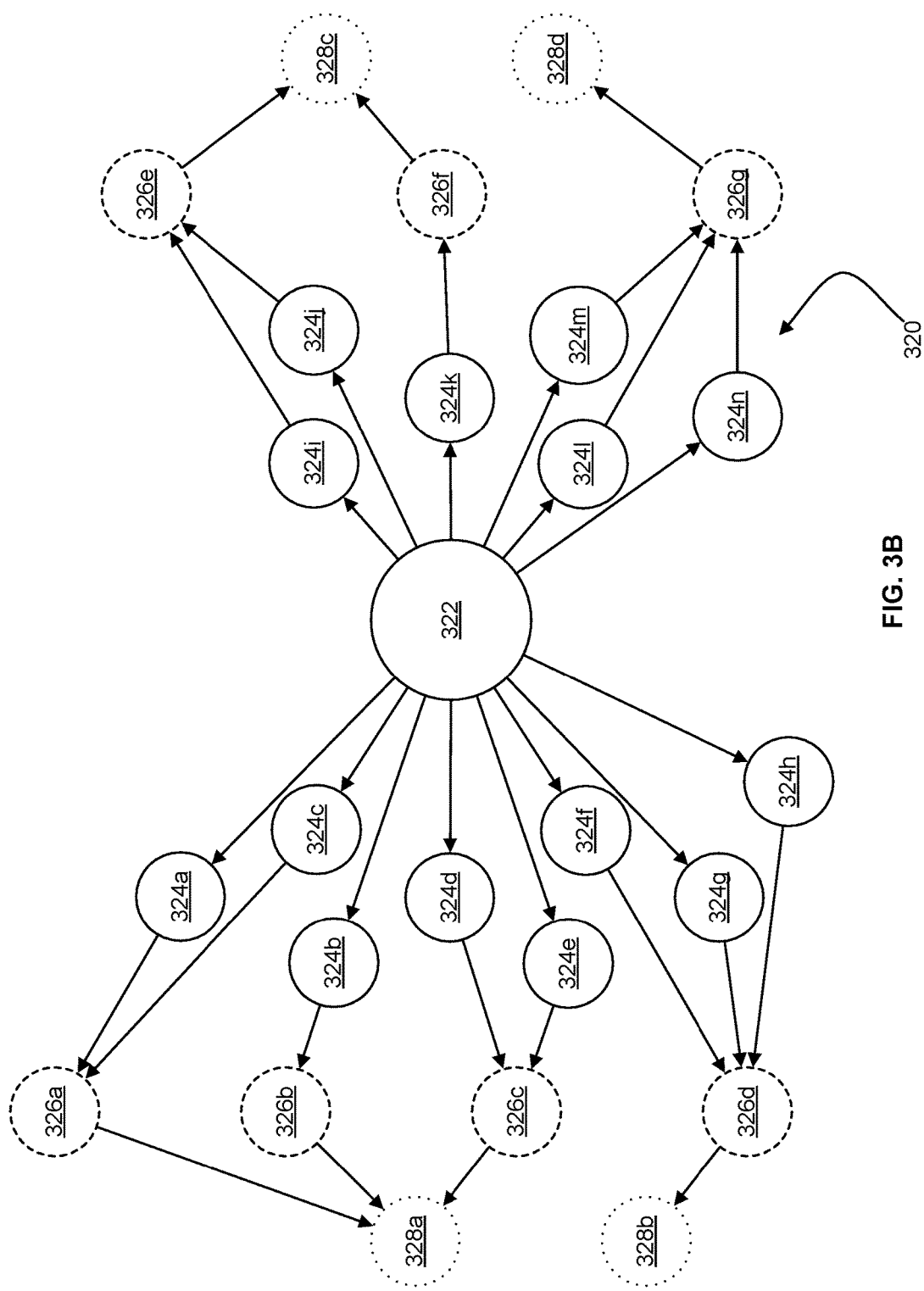
FIG. 3B shows alternative spending pattern vector of a user, in accordance with one or more embodiments of the invention.

FIG. 3B shows an example of an alternative spending pattern vector (320), in accordance with one or more embodiments of the invention. This alternative spending pattern vector (320) may be practiced using the prediction system (100) of FIGS. 1A and 1B or the computing system (500) of FIG. 5A, and in conjunction with the method described with respect to FIGS. 2A and 2B, above As illustrated in FIG. 3B, the alternative spending pattern vector (320) of a user (322) is assembled using transaction information. In one or more embodiments, alternative spending pattern vector (320) of the user (322) may be assembled by analyzing the spending information of the user (322). For example, by retrieving and analyzing credit card transactions, debit card transactions, etc. of the user (322), all merchants (324) from which the user (322) purchases goods and services may be extracted. Moreover, based on the merchants (324) from which the user purchases goods and services, various goods and services sub-categories (326) may be identified. Still yet, based on the goods and services sub-categories (326), various goods and services categories (328) may be identified.

Each of the merchants (324a-324n) may represent a different physical or legal entity. For example, a first merchant (324a) may include a clothing store chain (e.g., one of all H&M stores, all Nine West stores, all Express stores, or all Marshall's stores, etc.), a second merchant (324f) may include a shipping chain (e.g., one of all FedEx locations, or all UPS locations, etc.), and a third merchant (324i) may include a restaurant chain (e.g., one of all Wendy's locations, all Burger King locations, or all Arby's locations, etc.). As another example, three different merchants (324) may include three different physical locations of the same parent entity.

Also, one or more of the merchants (324a-324n) may be clustered into one of the goods and services sub-categories (326a-326g). For example, a first merchant (324i) may include all Wendy's locations, and a second merchant (324j) may include all Burger King locations. Accordingly, the first merchant (324i) and the second merchant (324j) may be grouped together into a fast food goods and services sub-category (326e). Additionally, a third merchant (324k) may include all Morton's Steakhouse locations, and the third merchant (324k) is grouped into a fine dining goods and services sub-category (326f). Still yet, the fast food goods and services sub-category (326e) and the fine dining goods and services sub-category (326f) are grouped together into a restaurants goods and services category (328c)

In one or more embodiments, the alternative spending pattern vector (320) for the user (322) may be derived using the financial data of the user (322). Further, using the alternative spending pattern vector (320) of the user (322), the prediction of a life event may be validated or augmented. In other words, the alternative spending pattern vector (320) for the user (322) may be used to confirm a life event identified to be affecting the user (322). For example, after predicting that a particular life event is affecting the user (322), the alternative spending pattern vector (320) may be compared to spending pattern vectors of other users known to be experiencing the same life event in order to confirm the prediction.

Figure 3C:
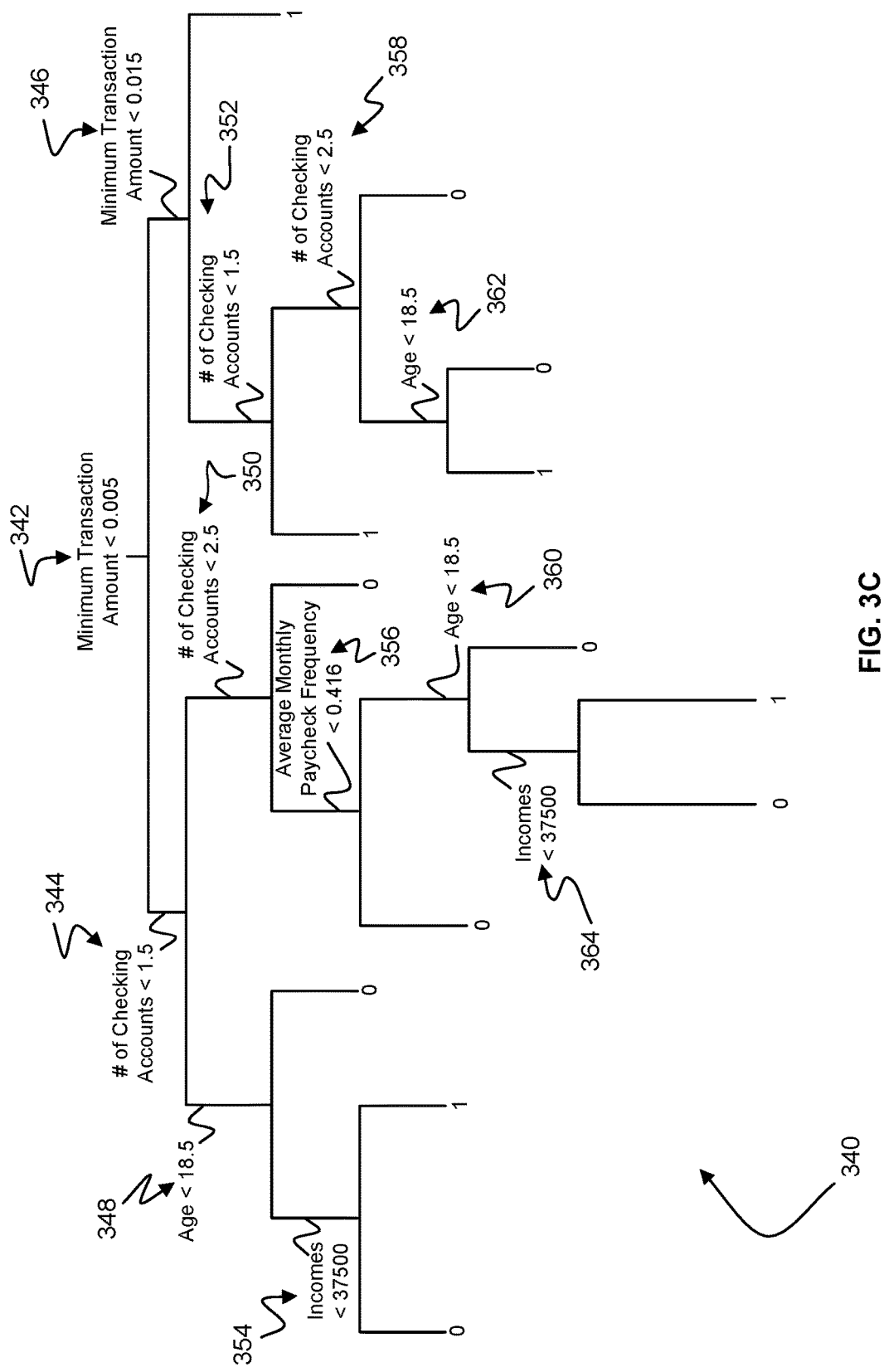
FIG. 3C shows a portion of a classification model, in accordance with one or more embodiments of the invention.

FIG. 3C shows an example of a decision tree (340), in accordance with one or more embodiments of the invention. This decision tree (340) may be practiced using the prediction system (100) of FIGS. 1A and 1B or the computing system (500) of FIG. 5A, and based on the method described with respect to FIGS. 2A and 2B, above.

As shown in FIG. 3C, the decision tree (340) is a single tree of a plurality of different trees generated by applying a random forest algorithm to attributes that are deterministic of a life event. Specifically, the decision tree (340) is a single tree of a random forest used to identify a profession of a user using financial data of the user. More specifically, the decision tree (340) is a single tree of a single class classification model that may be applied to the financial data of the user to determine whether or not the user works as an engineer.

As shown in FIG. 3C, the decision tree (340) includes a plurality of decisions (342-364). Each of the decisions (342-364) is based on a comparison of a value from the financial data of the user with a threshold value.

The root node of the decision tree (340) includes a decision based on spending information of the user. In particular, the root node of the decision tree (340) includes a first decision (342) regarding whether the user's minimum transaction amount is less than a value of 0.005. Moreover, the other nodes of the decision tree (340) include decisions based on income information of the user, payment information of the user, transaction information of the user, and/or other aspects of financial data of the user. For example, based on a result of the first decision (342), it is then determined, at a second decision (344), whether the user has less than 1.5 checking accounts; or determined, at a third decision (346) whether the user's minimum transaction amount is less than a value of 0.015. Additionally, the decision tree (340) includes decisions (354, 364) based comparisons of the user's income to an income threshold; decisions (348, 360, 362) based on comparisons of the user's age to an age threshold; decision (356) based on a comparison of the user's pay period frequency to a pay period frequency threshold; and decisions (350, 352, 358) based on comparisons of the user's number of checking accounts to one or more threshold numbers of checking accounts.

Based on the comparisons noted above at the various decisions nodes, the decision tree (340) may be traversed to arrive at a leaf node that provides a decision of '0' or '1'. In one or more embodiments, a traversal of the decision tree (340) that arrives at a leaf node with a value of '1' results in a vote that the relevant life event is affecting the user (i.e., that the user works as an engineer). Conversely, a traversal of the decision tree (340) that arrives at a leaf node with a value of '0' results in a vote that the relevant life event is not affecting the user (i.e., that the user does not work as an engineer).

In one or more embodiments, a plurality of a different trees built using the same pool of attributes may be used to accurately identify a life event affecting a user. For example, the results of other decision trees from the same random forest as the decision tree (340) may be aggregated to determine whether or not a particular user is employed as an engineer.

Figure 4B:
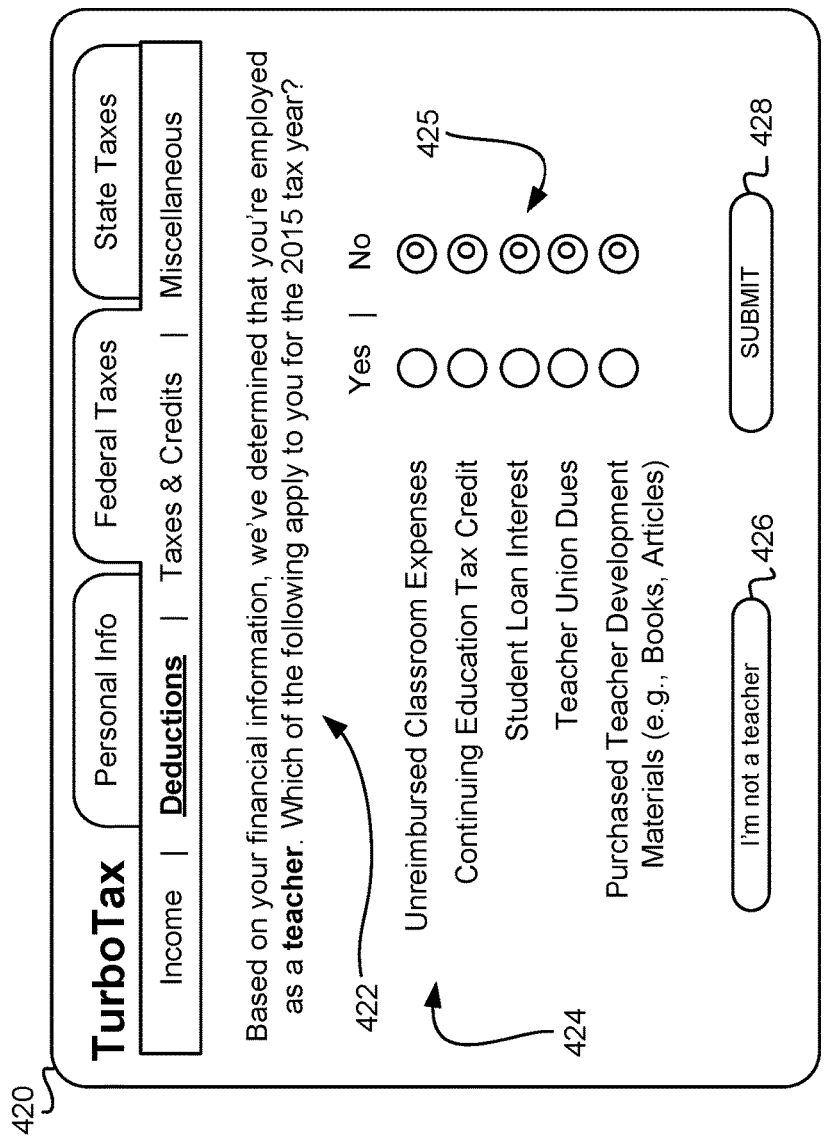
Figure 4C:
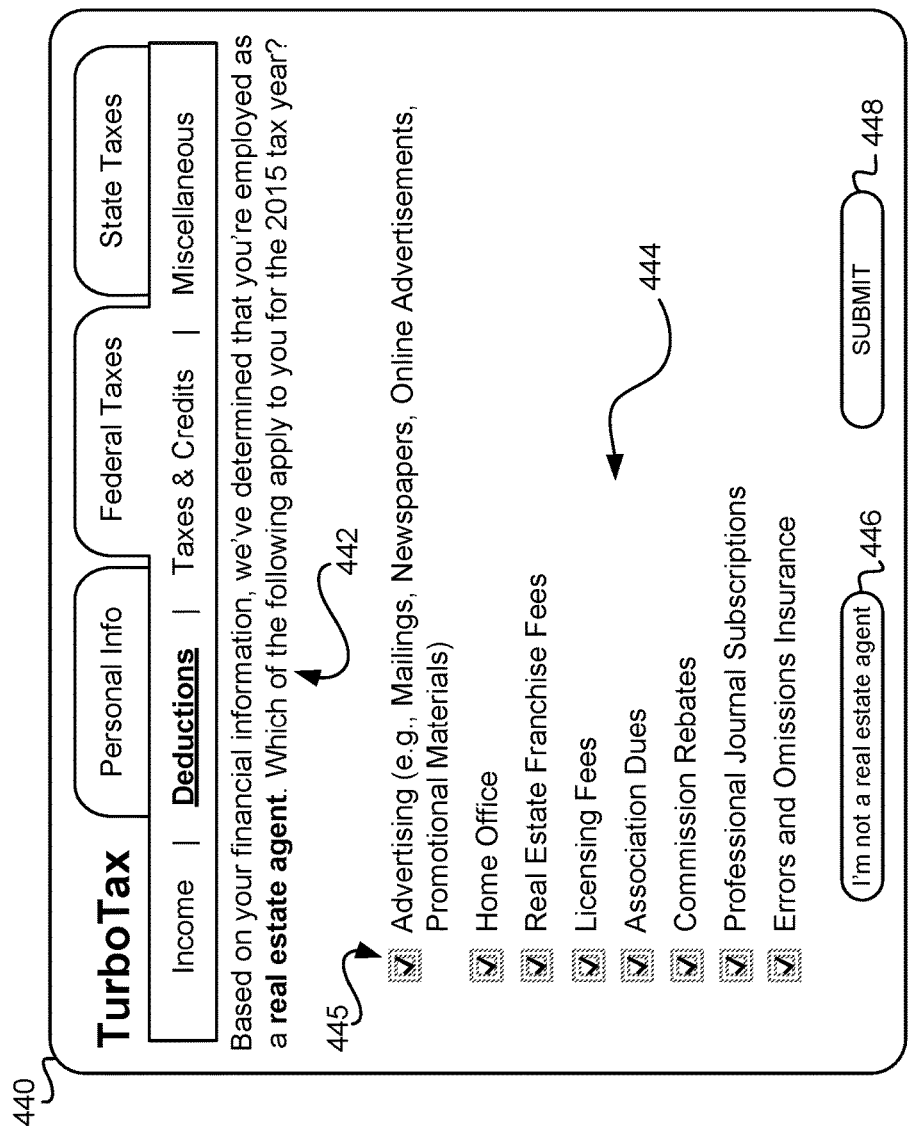

FIGS. 4A, 4B, and 4C illustrate the customization of a user interface of an application based on an identified life event of a user, in accordance with one or more embodiments of the invention. The user interfaces of FIGS. 4A, 4B, and 4C may be generated in the context of the prediction system (100) of FIG. 1A or the computing system (500) of FIG. 5A, and based on the method described with respect to FIGS. 2A and 2B above.

Now referring to FIG. 3A, a generic user interface (400) of an application is shown ready to receive user input. In particular, as evidenced by a text prompt (402), the generic user interface (400) of TurboTax has begun to request user input regarding tax deductions for determining the user's tax liability for the 2015 tax year. More specifically, the text prompt (402) contains a broad and generalized question (i.e., "do any of the following apply to you?") regarding whether any potential tax deductions in a general list (404) of tax deductions are relevant to the user. As shown in FIG. 4A, each of the tax deductions in the general list (404) is associated with a set of radio buttons within a user response area (406). Specifically, for each of a plurality of tax deductions (e.g., mortgage interest, mortgage prepayment penalties, etc.), the users selects a radio button corresponding to "Yes" or "No" to indicate whether the user believes the particular tax deduction applies to him or her. After selecting the user-appropriate deductions using the radio buttons in the user response area (406), the user may select a submission button (408) to begin entering the details of any deductions that are applicable to the user.

Problematically, due to the broad language used within the generic user interface (400), the user may not know whether he or she is able to claim any of the tax deductions in the general list (404). For example, the user may be a teacher who has purchased items for a classroom using his or her own money. Further, the user may have paid dues to a teachers' union during the 2015 tax year. However, because of the wording used on the generic user interface (400), the user may not readily determine to which category of deduction each expense belongs, or, even worse, may not even realize he or she should itemize such expenses as tax deductions.

Referring now to FIG. 4B, a customized user interface (420) of an application is shown ready to receive user input. In particular, as evidenced by a text prompt (422), the customized user interface (420) of TurboTax has begun to request user input regarding tax deductions for determining the user's tax liability for the 2015 tax year. However, unlike the generic user interface (400) of FIG. 4A, the customized user interface (420) of FIG. 4B has been tailored based on a life event previously identified as affecting the user. In particular, based on the user's financial data, the profession of the user has been identified, and, more specifically, the user has been identified to work as a teacher.

Accordingly, based on the identified life event (i.e., profession), the text prompt (422) contains a targeted question (i.e., "we've determined that you're employed as a teacher . . .") to ask whether any potential tax deductions in a customized list (424) of tax deductions are relevant to the user. As shown in FIG. 4B, each of the tax deductions in the customized list (424) is associated with a set of radio buttons within a user response area (425). Specifically, for each of a plurality of tax deductions (e.g., unreimbursed classroom expenses, continuing education tax credit, etc.), the users selects a radio button corresponding to "Yes" or "No" to indicate whether the user believes the particular tax deduction applies to him or her. After selecting the user-appropriate deductions using the radio buttons in the user response area (425), the user may select a submission button (428) to begin entering the details of any deductions that are applicable to the user.

Moreover, each of the tax deductions in the customized list (424) has been tailored or phrased in a manner more relevant to the life event (i.e., profession) affecting the user. For example, rather than asking whether the user would like to claim deductions relating to occupational taxes and business expenses, the customized list (424) has been tailored to ask the user about unreimbursed classroom expenses, continuing education tax credits, teacher union dues, and the purchase of teacher development materials. In other words, display of the generic user interface (400) to the user is prevented based on the profession of the user. As a result of the wording used on the customized user interface (420), the user may claim an expense as a tax deduction without appreciating which category the expense is classified within by the IRS. Further, as a result of the wording used on the customized user interface (420), the user may be reminded of otherwise forgotten tax deductible expenses incurred during the 2015 tax year. Moreover, as a result of the wording used on the customized user interface (420), the user may quickly and easily claim the appropriate deductions.

In one or more embodiments, if the user determines that the identified life event is not affecting the user, then the user may provide a response communicating this inaccuracy or mistake. For example, in the context of FIG. 4B, if the user does not work as a teacher, then the user may select a button (426) to communicate that he or she is not a teacher. In one or more embodiments, after selecting the button (426) to communicate that he or she is not a teacher, the user may be asked to clarify his or her actual profession. In other embodiments, the user may simply be provided with a general user interface, such as the generic user interface (400) of FIG. 4A. If the user clarifies his or her actual profession, the user's actual profession, in conjunction with his or her financial data may be fed back into a training data set to adjust and advance the classification model originally used to identify the user's profession. Moreover, if the user clarifies his or her actual profession, then the user may be provided a customized user interface for users of that profession.

Referring now to FIG. 4C, another customized user interface (440) of an application is shown ready to receive user input. In particular, as evidenced by a text prompt (442), the customized user interface (440) of TurboTax has begun to request user input regarding tax deductions for determining the user's tax liability for the 2015 tax year. Unlike the generic user interface (400) of FIG. 3A, and similar to the customized user interface (420) of FIG. 4B, the customized user interface (440) of FIG. 4C has been tailored based on a life event previously identified as affecting the user. In particular, based on the user's financial data, the profession of the user has been identified, and, more specifically, the user has been identified to work as a real estate agent. As an option, the customized user interface (440) of TurboTax may also be presented to the user after the user selects the button (426) of FIG. 4B to communicate that he or she is not a teacher, and then identifies himself or herself as a real estate agent.

Accordingly, based on the identified life event (i.e., profession), the text prompt (442) contains a targeted question (i.e., "we've determined that you're employed as a real estate agent . . . ") to ask whether any potential tax deductions in a customized list (445) of tax deductions are relevant to the user. As shown in FIG. 4C, each of the tax deductions in the customized list (445) is associated with a checkbox within a user response area (444). Specifically, for each of a plurality of tax deductions (e.g., advertising, home office, real estate franchise fees, etc.), the users activates a corresponding checkbox to indicate that he or she believes the particular tax deduction applies to him or her. After selecting the user-appropriate deductions using the checkboxes in the user response area (444), the user may select a submission button (448) to begin entering the details of any deductions that are applicable to the user.

Again, each of the tax deductions in the customized list (445) has been tailored or phrased in a manner more relevant to the profession of the user. For example, rather than asking whether the user would like to claim deductions relating to occupational taxes and business expenses, the customized list (445) has been tailored to ask the user about advertising expenses, use of a home office, real estate franchise fees, licensing fees, commission rebates, and errors and omissions insurance. As a result of the wording used on the customized user interface (440), the user may claim an expense as a tax deduction without appreciating which category the expense is classified within by the IRS. Further, as a result of the wording used on the customized user interface (440), the user may be reminded of otherwise forgotten tax deductible expenses incurred during the 2015 tax year. Moreover, as a result of the wording used on the customized user interface (440), the user may quickly and easily claim the appropriate deductions.

In one or more embodiments, if the user determines that the identified life event is not affecting the user, then the user may provide a response communicating this inaccuracy or mistake. For example, in the context of FIG. 4C, if the user does not work as a real estate agent, then the user may select a button (446) to communicate that he or she is not a real estate agent. In one or more embodiments, after selecting the button (446) to communicate that he or she is not a real estate agent, the user may be asked to clarify his or her actual profession. Again, any clarifications by the user regarding the user's actual profession, in conjunction with the user's financial data, may be fed back into a training data set to adjust and advance the classification model originally used to identify the user's profession.

In this way, the interface of a software package or platform may be tailored based on a life event that has been identified as affecting a user. The tailoring of the software package or platform may be such that, based on the life event affecting the user, a portion of the interface is prevented from being displayed to the user. The portion of the interface that is prevented from being displayed to the user may be an aspect of the software package or platform that is less relevant or useful than a customized interface.

In this way, a classification model may be used for building services that are tailored to various users. For example, the classification model may be applied to a user's data as the user registers for, logs in to, or otherwise uses an application, and the interaction of the user with the application may be customized to increase the relevancy of the application to the user. In one or more embodiments, a life event may be determined by a 1:1 call to apply a classification model to the financial data of a specific user. In one or more embodiments, life events affecting a group of users may be determined by a bulk call to apply a classification model to the financial data of the users in the group.

Figure 5A:
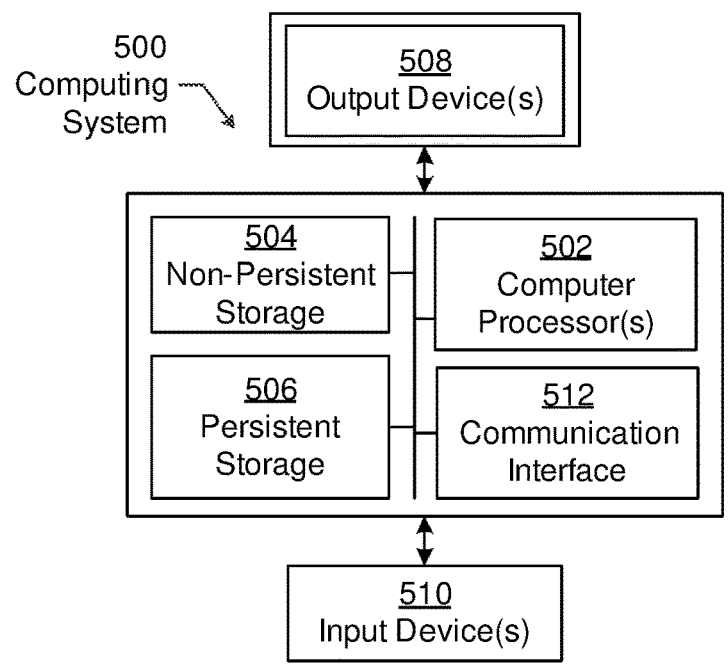
FIG. 5A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
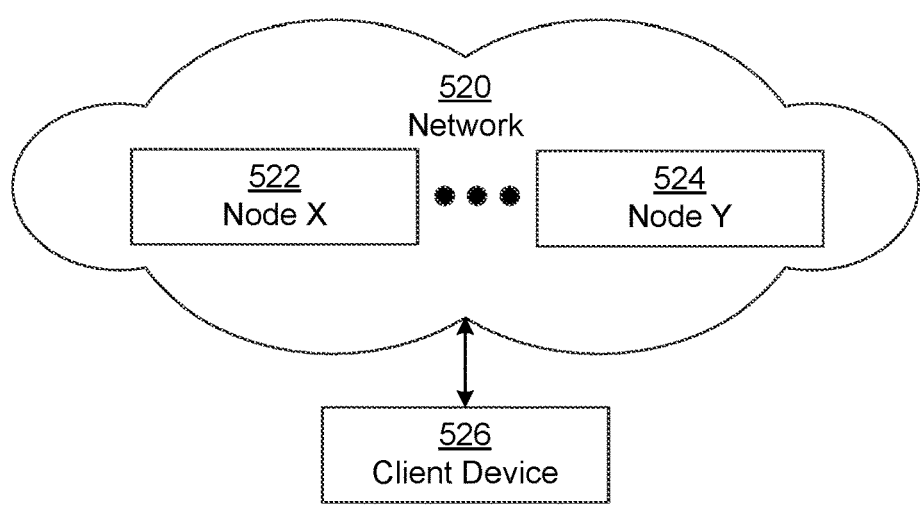
FIG. 5B shows a group of computing systems, in accordance with one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying a life event affecting a first user, comprising:
   obtaining, by a computer processor, a classification model that models how financial data of users relate to life events, wherein the classification model comprises a machine learning model;
   gathering, by the computer processor, the financial data of the first user, wherein the financial data of the first user matches at least a subset of the classification model;

identifying, by the computer processor, by applying the classification model to the financial data of the first user, the life event affecting the first user;

deriving, by the computer processor and using the financial data of the first user, an alternative spending pattern vector for the first user, the alternative spending pattern vector being based on the life event;

confirming, by the computer processor, the life event by comparing the alternative spending pattern vector to a known spending pattern vector corresponding to a second user known to be experiencing a same life event as the life event of the first user; and customizing, by the computer processor, based on confirming the identified life event, a user interface of a software application utilized by the first user.

2. The method of claim 1, wherein the life event affecting the first user includes at least one of a debt event, an income event, and an asset event.

3. The method of claim 2, wherein the life event affecting the first user is an income event comprising a profession of the first user.

4. The method of claim 3, wherein customizing the user interface includes preventing, based on the profession of the first user, presentation to the first user of a portion of the application.

5. The method of claim 3, further comprising classifying, based on the profession of the first user, the user into a user segment, and offering to the first user a product associated with the user segment.

6. The method of claim 3, wherein the financial data of the first user includes at least one of income information of the first user, spending information of the first user, payment information of the first user, and transaction information of the first user.

7. The method of claim 3, further comprising:
receiving historical data of a plurality of users;
generating, from the historical data of the plurality of users, a training dataset containing historical data of a first portion of the plurality of users;
generating, from the historical data of the plurality of users, a test dataset containing historical data of a second portion of the plurality of users;
identifying a plurality of attributes by performing feature engineering on the training dataset;
generating, based on the plurality of attributes, the classification model; and
testing the classification model on the test dataset.

8. The method of claim 7 wherein the plurality of attributes comprises, for each training user of the plurality of users in the training dataset, attributes of spending behaviors of the training user in the training dataset.

9. The method of claim 1, wherein the machine learning model comprises a random forest algorithm.

10. The method of claim 1, wherein the machine learning model comprises a decision tree-based classifier.

11. A system for identifying a life event affecting a first user, comprising:
a hardware processor and memory; and
software instructions stored in the memory and configured to execute on the hardware processor, which, when executed by the hardware processor, cause the hardware processor to:
obtain a classification model that models how financial data of users relate to life events, wherein the classification model comprises a machine learning model;

gather the financial data of the first user, wherein the financial data of the first user matches at least a subset of the classification model;

identify, by applying the classification model to the financial data of the first user, the life event affecting the first user;

derive, using financial data of the first user, an alternative spending pattern vector for the first user, the alternative spending pattern vector being based on the life event;

confirm the life event by comparing the alternative spending pattern vector to a known spending pattern vector corresponding to a second user known to be experiencing a same life event as the life event of the first user; and customize, based on confirming the identified life event, a user interface of a software application utilized by the first user.

12. The system of claim 11, wherein the classification model is obtained from a feature engineering component of a life event predictor, and the financial data is gathered from a financial data repository.

13. The system of claim 11, wherein the software instructions, when executed by the hardware processor, further cause the hardware processor to:
retrieve, from a financial data repository, historical data of a plurality of users;
generate, using a dataset generator, from the historical data of the plurality of users, a training dataset containing historical data of a first portion of the plurality of users;
generate, using the dataset generator, from the historical data of the plurality of users, a test dataset containing historical data of a second portion of the plurality of users;
generate, by a feature engineering component and based on a plurality of attributes, a classification model by performing feature engineering on the training data set; and
testing, using a classification model tester, the classification model on the test dataset.

14. The system of claim 11, wherein the life event affecting the first user includes at least one of a debt event, an income event, and an asset event.

15. The system of claim 14, wherein the life event affecting the first user is an income event comprising a profession of the first user.

16. The system of claim 15, wherein the financial data of the first user includes at least one of income information of the first user, spending information of the first user, payment information of the first user, and transaction information of the first user.

17. A non-transitory computer readable medium storing instructions for identifying a life event affecting a first user, the instructions, when executed by a computer processor, comprising functionality for:
obtaining a classification model that models how financial data of users relate to life events, wherein the classification model comprises a machine learning model;
gathering the financial data of the first user, wherein the financial data of the first user matches at least a subset of the classification model;
identifying, by applying the classification model to the financial data of the first user, a life event affecting the first user;

deriving, using financial data of the first user, an alternative spending pattern vector for the first user, the alternative spending pattern vector being based on the life event;

confirming the life event by comparing the alternative spending pattern vector to a known spending pattern vector corresponding to a second user known to be experiencing a same life event as the life event of the first user; and customizing, based on confirming the identified life event, a user interface of a software application utilized by the first user.

18. The non-transitory computer readable medium of claim 17, wherein the life event affecting the first user includes at least one of a debt event, an income event, and an asset event.

19. The non-transitory computer readable medium of claim 18, wherein the life event affecting the first user is an income event comprising a profession of the first user.

20. The non-transitory computer readable medium of claim 19, wherein the financial data of the first user includes at least one of income information of the first user, spending information of the first user, payment information of the first user, and transaction information of the first user.

* * * * *